United States Patent
Whitehead et al.

(10) Patent No.: US 7,576,905 B2
(45) Date of Patent: Aug. 18, 2009

(54) ELECTROSTATICALLY-CONTROLLED DIFFRACTION GRATINGS USING IONIC ELECTROPHORESIS

(75) Inventors: Lorne A. Whitehead, Vancouver (CA); John S. Huizinga, White Bear Lake, MN (US)

(73) Assignees: 3M Innovative Properties Company, St. Paul, MN (US); The University of British Columbia, Vancouver, British Columbia (CA)

( * ) Notice: Subject to any disclaimer, the term of this patent is extended or adjusted under 35 U.S.C. 154(b) by 93 days.

(21) Appl. No.: 11/678,245

(22) Filed: Feb. 23, 2007

(65) Prior Publication Data

US 2008/0204854 A1    Aug. 28, 2008

(51) Int. Cl.
   *G02B 26/00*   (2006.01)
(52) U.S. Cl. ....................... 359/296; 359/290
(58) Field of Classification Search ........ 359/245, 359/252–254, 256–258, 263, 265–275
See application file for complete search history.

(56) References Cited

U.S. PATENT DOCUMENTS

| | | | |
|---|---|---|---|
| 4,115,747 A | 9/1978 | Sato et al. | |
| 5,866,204 A | 2/1999 | Robbie et al. | |
| 6,206,065 B1 | 3/2001 | Robbie et al. | |
| 6,248,422 B1 | 6/2001 | Robbie et al. | |
| 6,885,496 B2 | 4/2005 | Whitehead et al. | |
| 6,891,658 B2 | 5/2005 | Whitehead et al. | |
| 7,262,899 B2 * | 8/2007 | Bigman | 359/269 |

2002/0027840 A1    3/2002    Morishita et al.

FOREIGN PATENT DOCUMENTS

| | | |
|---|---|---|
| GB | 2286057 | 2/1995 |
| JP | 07-209509 | 8/1995 |
| WO | PCT/CA2007/000593 | 4/2007 |

OTHER PUBLICATIONS

U.S. Appl. No. 60/745,106, filed Apr. 19, 2006, Whitehead. Expired provisional application.
Kwong, Vincent H., et al., "Electrical modulation of diffractive structures", *Applied Optics* vol. 41, No. 16, (Jun. 1, 2002),3343-3347.
Murau, P., et al., "The understanding and elimination of some suspension instabilities in an electrophoretic display", *Journal of Applied Physics* vol. 49, No. 9, (Sep. 1978),4820-4829.
Zhuangchun, Wu, et al., "Transparent, Conductive Carbon Nanotube Films", *Science* vol. 305, www.sciencemag.org,(Aug. 27, 2004), 1273-1276.

* cited by examiner

*Primary Examiner*—Timothy J Thompson
(74) *Attorney, Agent, or Firm*—Pauly, DeVries, Smith & Deffner, L.L.C.

(57) ABSTRACT

A diffraction grating for which the intensity and/or direction of the diffracted light is electronically modulated using the electrophoresis of an index-modifying species. Index-modifying dye ions are dissolved in an electrophoretic medium maintained adjacent the diffraction grating. Application of a voltage across the medium moves many of the ions into the region adjacent the grating such that the ions absorb the incident light or otherwise modify the local index of refraction so as to change the optical characteristics of the diffracted light. Application of an opposite voltage across the medium moves many of the ions away from the grating, allowing light rays to diffract in a different manner when encountering the grating.

32 Claims, 5 Drawing Sheets

ELECTROSTATICALLY-CONTROLLED DIFFRACTION GRATINGS USING IONIC ELECTROPHORESIS

TECHNICAL FIELD

This disclosure pertains to electrostatic control of a diffraction grating to modulate the characteristics of diffracted light. Particular embodiments provide modulation of the intensity and/or direction of the diffracted light.

BACKGROUND

The electrophoresis of electrostatically-charged species toward an interface between two materials, in order to modify the effective refractive index value in the region near the interface is known. Such electrophoresis may cause a change in the behavior of incident light rays. This change in the behavior of incident light rays has been investigated with regard to creating high reflectance image displays based on total internal reflection of the type described in U.S. Pat. Nos. 6,885,496 and 6,891,658. Generally, the charged electrophoretic materials are pigments.

One problem when the electrophoretic species are pigment particles is that the electrophoretic particles exhibit undesirable clustering over time. More particularly, the particles tend to form loose agglomerates within the electrophoretic medium, while surrounding regions of the electrophoretic medium contain relatively few suspended particles. Such clustering of absorptive particles can cause long-term deterioration of the performance of the device as described, for example, in "The understanding and elimination of some instabilities in an electrophoretic display", P. Murau and B. Singer, Journal of Applied Physics, Vol. 49(9), 1978. For this reason, although considered, modulation of diffraction gratings using electrophoresis of pigment particles has not been pursued. (See "Electrical modulation of diffractive structures", V. Kwong, M. Mossman and L. Whitehead, Applied Optics, Vol 41(16), 3343-3347, 2002.)

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DESCRIPTION

Throughout the following description, specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

One embodiment of this invention utilizes total internal reflection "TIR"), a phenomenon that can result as light passes from an optically dense material to an optically less dense material (e.g. from a material having a relatively high refractive index to a material having a relatively low refractive index). As is well known, the TIR interface between the two media of different indices of refraction is characterized by a critical angle. Light rays incident upon the interface at angles less than the critical angle, where the angle of incidence is understood to be the angle that the light ray makes to the normal of the surface upon which it is incident, are transmitted through the interface. Light rays incident upon the interface at angles greater than the critical angle undergo TIR at the interface.

Figure 1A:
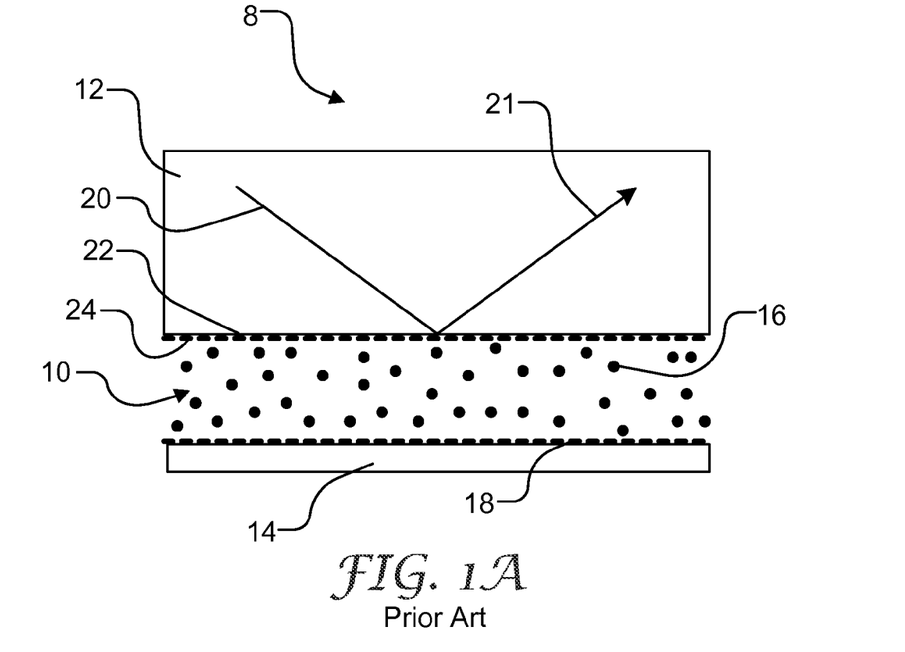
FIGS. 1A and 1B are greatly enlarged, not to scale, cross-sectional side elevation views of a portion of an electrophoretically frustrated prior art reflective image display.
Figure 1B:
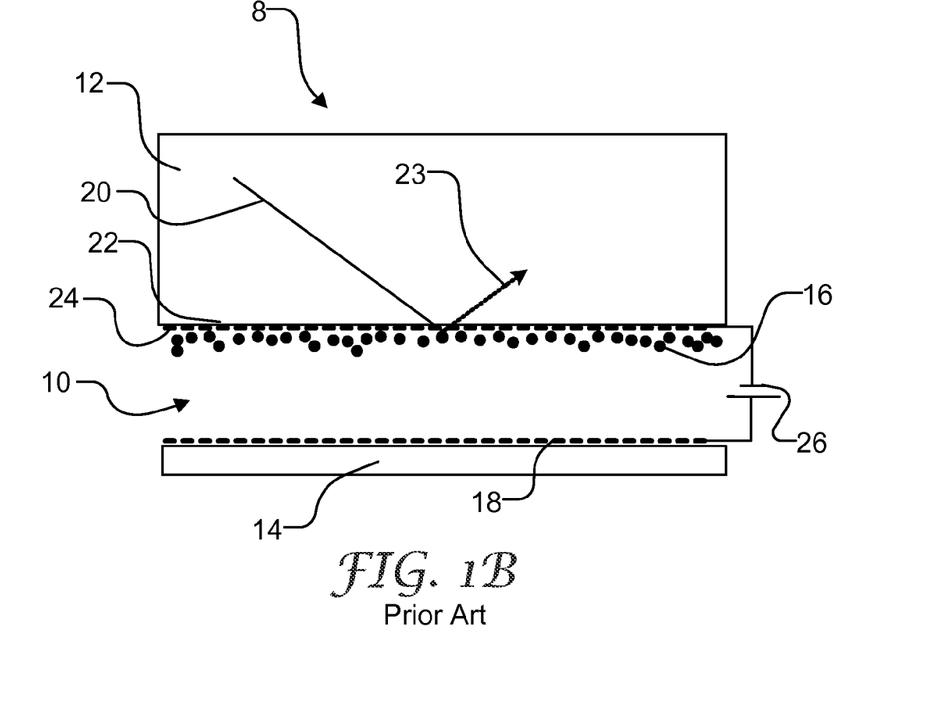

FIGS. 1A and 1B schematically depict the operation of a prior art TIR-based optical device 8. As depicted in FIG. 1A, device 8 incorporates an electrophoresis medium 10 which is maintained adjacent a transparent, optically dense material 12, such as plastic or glass. Medium 10 is contained within a reservoir defined by optically dense material 12 and substrate 14. A low refractive index (i.e. less than about 1.35), low viscosity liquid, such as water, is a suitable electrophoresis medium. The optical characteristics of substrate 14 are relatively unimportant: it need only contain electrophoresis medium 10 and serve as a support for backplane electrode 18.

An absorptive electrostatically charged species 16 is suspended in the electrophoresis medium. In prior art device 8, electrophoresis species 16 is a pigment having molecular dimensions on the order of several hundred nanometers. Some prior art devices make use of even larger electrophoretic species 16 (e.g. greater than 500 nm) which act as scattering centers for incident light).

Device 8 also incorporates a pair of electrodes 18, 24 (shown in FIGS. 1A and 1B as dashed lines). Electrodes 18, 24 can be applied to the surfaces of optical dense material 12 and substrate 14 by vapor-deposition of the appropriate conductive material. Electrode 24 is transparent and sufficiently thin to minimize its interference with light rays at the TIR interface. Backplane electrode 18 need not be transparent, depending on the operation mode of device 8.

In the absence of electrophoretic activity, as is illustrated in FIG. 1A, a light ray 20 encountering interface 22 undergoes TIR and reflects from interface 22 as reflected ray 21. As illustrated in FIG. 1B, a voltage source 26 connected between electrodes 18, 24 so as to cause electrophoresis in medium 10. In this circumstance, electrostatically-charged species 16 is electrophoretically moved into the region where the evanescent wave is relatively intense (i.e. within 0.25 μm of interface 22, or closer). When species 16 moves electrophoretically in this manner, species 16 scatters, transmits and/or absorbs incident light 20 at interface 22, because of the change in the difference of index of refraction at interface 22. This is typically referred to as "frustrating" the TIR. The change in the index difference may be in the real or imaginary (relating to light absorption) component of the indices or both. In FIG. 1B, the process of scattering or absorbing light from incident light 20 is schematically illustrated by a dashed line, which represents a relatively weak intensity reflected ray 23. The remainder of the incident light 20 is scattered and/or absorbed as it strikes electrophoretic species 16 inside the thin (approximately 0.5 μm) evanescent wave region at interface 22.

When voltage 26 is applied (as in FIG. 1B), a "dark" appearance is achieved in each TIR-frustrated, non-reflective absorption region. Electrophoretic species 16 need only be moved outside the thin evanescent wave region, by suitably actuating voltage source 26, in order to restore the TIR capability of interface 22 and to thereby convert each "dark" non-reflective absorption region to a "white" reflection region.

As described above, the net optical characteristics of device 8 can be controlled by controlling the voltage applied across electrophoretic medium 10 via electrodes 18, 24. Electrodes 18, 24 can be segmented to control the electrophoretic activation of medium 10 across separate regions of device 8.

The present invention involves an alternate system to electrophoretically control optical characteristics of the device which employs a solution of index-modifying ions (also referred to as index-modifying species). Index-modifying ions may include light-absorbing ions and/or ions which otherwise have an impact on the local index of refraction of a solution in which they are dissolved. Such index-modifying ions may be dye ions, for example.

The use of a solution of relatively small index-modifying ions avoids the use of a suspension of relatively large pigment particles, thus reducing the susceptibility of the device to shortcomings caused by pigment particle agglomeration. The system electrostatics and thermodynamics associated with dissolved dye ions are such that the dye ions do not exhibit the tendency to agglomerate as the pigment particles do. In addition, the ions are likely to migrate more quickly in response to the applied electric field since they have roughly the same electrostatic charge but much smaller (e.g. at least an order of magnitude smaller) physical dimensions and mass than pigment particles. As a result, devices which make use of index-modifying dye ions as an electrophoretic species can be operated at much lower voltage (e.g. less than 1V) and are likely to exhibit no hysteresis in response to the applied voltage. In addition, the chemical purity of the solution is likely to be much higher, which is desirable since chemical impurities can result in unpredictable behavior.

As described in more detail below, the electrophoresis of index-modifying ions to modify the effective refractive index value in the region near an interface can be used to electrostatically control a diffraction grating and to thereby modulate the intensity and/or direction of the diffracted light.

Diffractive optical elements are able to carry out a wide range of important optical functions including, but not limited to, operations normally carried out by refractive elements. In accordance with particular embodiments of the invention, diffractive optical elements are formed in such a way that they can be electronically controlled by the electrophoresis of index-modifying, electrostatically-charged species which are sub-wavelength in size, which are dissolved in a solvent and which have an effective refractive index that is different from the surrounding solvent.

It is well known that liquid crystal displays have made use of electronically controlled diffraction. However, in order to have a sufficient impact on the transmission of light through a liquid crystal display, it is necessary for the liquid crystal layer to be at least several microns thick. Because of fringing electric field effects, the pitch dimension of electronically controllable diffracting gratings used in liquid crystal applications is limited to several microns. In contrast, using the current invention, substantial modification of the refractive index (and corresponding impact on the characteristics of incident light) can occur in a much thinner layer (e.g. less than 0.5 μm), thereby permitting the fabrication of effective diffraction gratings with comparatively high spatial frequency (i.e. comparatively low pitch dimension). In some embodiments, electronically controllable diffraction gratings are provided with pitch dimensions of less than 0.5 μm. This comparatively high spatial frequency is desirable for a variety of beam-steering applications.

Figure 2A:
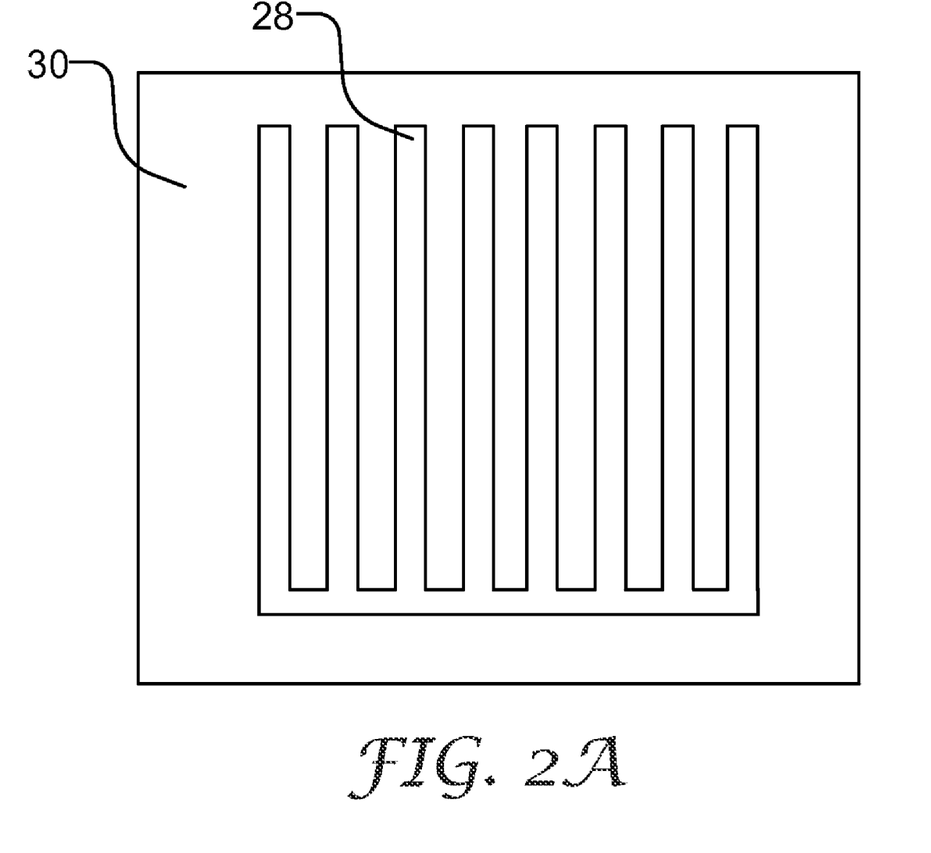
FIGS. 2A and 2B are greatly enlarged, not to scale, top view and cross-sectional side elevation views, respectively, of a diffraction grating.
Figure 2B:
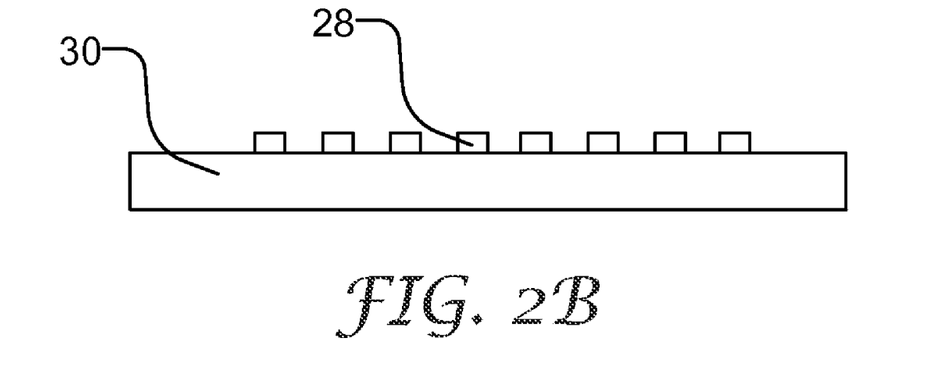

FIGS. 2A and 2B schematically depict a diffraction grating 28 that is prepared using a patterned layer of transparent conductor (such as Indium Tin Oxide) on a glass substrate 30. In the system of FIGS. 2A and 2B, a diffraction pattern is observed when light is transmitted through grating 28 or reflected from the surface of grating 28.

Figure 3A:
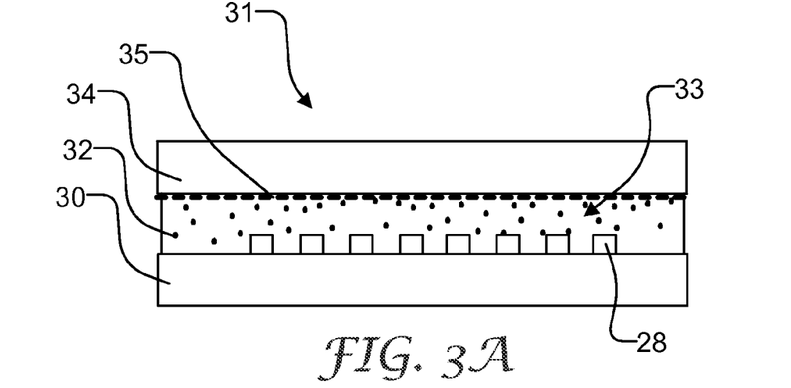
FIGS. 3A, 3B and 3C are greatly enlarged, not to scale, cross-sectional side elevation views of a portion of an electrophoretically modulated diffraction grating according to an exemplary embodiment of the invention.
Figure 3B:
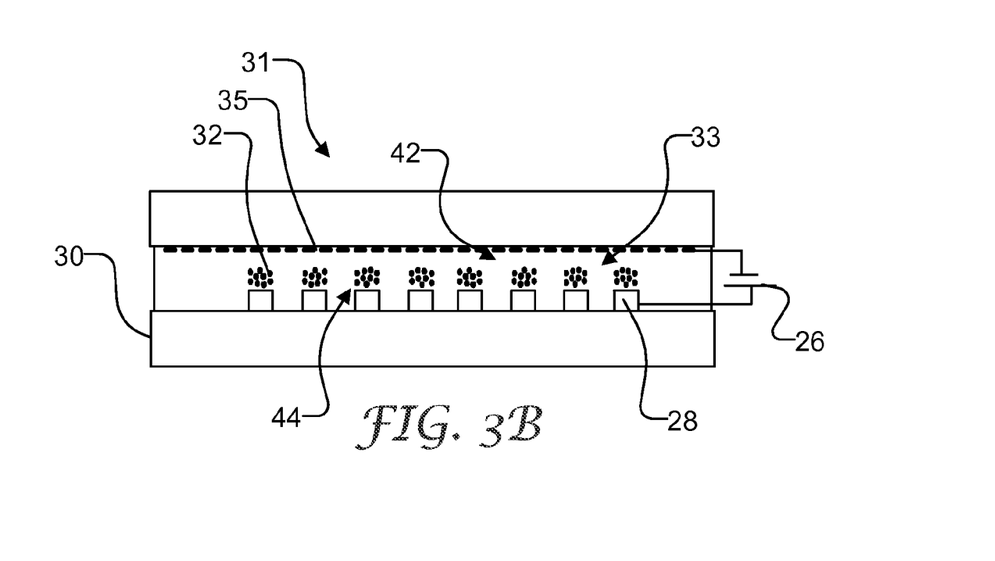
Figure 3C:
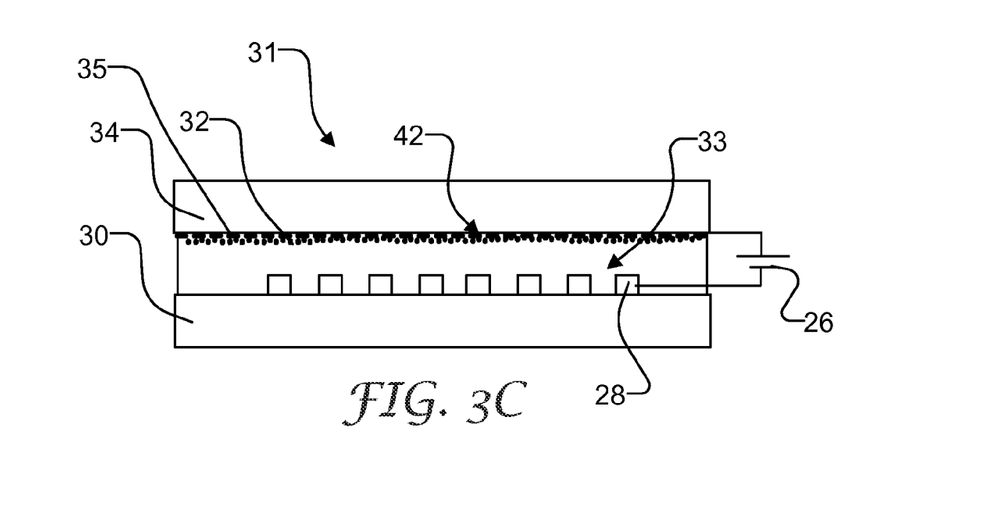

FIGS. 3A, 3B and 3C show schematic, cross-sectional views of a portion of an electrophoretically modulated diffraction grating device 31 according to an exemplary embodiment of the invention. As depicted in FIG. 3A, device 31 incorporates a diffraction grating 28 formed on a substrate 30 and an electrophoresis medium 33 contained in a reservoir between substrate 30 and superstrate 34. An electrode 35 is provided at or near the junction between superstrate 34 and medium 33. Electrophoresis medium 33 contains index-modifying ions 32 which are preferably dissolved in medium 33. The solvent in which ions 32 are dissolved to form medium 33 is preferably a liquid, with a low refractive index (i.e. less than about 1.35) and a low viscosity, such as water, for example. Ions 32 are preferably formed from dye molecules which are at least moderately soluble in the solvent of medium 33 and which dissociate into their ionic constituents when dissolved in the solvent of medium 33. Medium 33 accordingly contains a large number of ions 32 which can be electrophoretically moved toward or away from diffraction grating 28 by applying an appropriate electric field.

Dissolved ions 32 are index-modifying ions which have the ability to modify the local effective refractive index in medium 33 when concentrated within a small volume of the solution. In some embodiments, index-modifying ions 32 are light-absorbing ions. Where ions 32 are light-absorbing ions, the refractive index modification may involve modification of both the real and/or imaginary refractive index components. In other embodiments, index-modifying ions 32 are non-light-absorbing ions, in which case, the refractive index modification may involve modification of only the real refractive index component.

A voltage source 26 may be connected between electrode 35 and diffraction grating 28 (which also functions as an electrode). As shown in FIG. 3B, voltage source 26 may provide a first voltage between electrode 35 and grating 28 to cause electrophoresis in medium 33. In FIG. 3B, the polarity of voltage source 26 is such that a large number of index-modifying ions 32 dissolved in medium 33 are electrophoretically moved into, and concentrated within, region 44 (i.e. a region adjacent diffraction grating 28). Simultaneously, index-modifying ions 32 may be electrophoretically moved out of region 42 (i.e. a region adjacent superstrate 34). Ions 32 which move out of region 42 do not necessarily move into region 44, but rather may remain within medium 33, between regions 42 and 44.

In FIG. 3C, voltage source 26 applies a second voltage, having opposite polarity to the first voltage, between diffraction grating 28 and electrode 35. Index-modifying ions 32 may be electrophoretically moved out of the region 44 (near grating 28), which becomes a depletion region containing a comparatively small number of index-modifying ions 32. Simultaneously, a large number of index-modifying ions 32 are electrophoretically moved into and concentrated within region 42 (adjacent electrode 35), which becomes a concentration region. Preferably, region 42 contains a sufficiently large number of index-modifying ions 32 to substantially cover the outward surface of electrode 35. Molecules which move out of region 44 do not necessarily move into region 42, but rather may remain within medium 33, between regions 42 and 44.

Figure 4A:
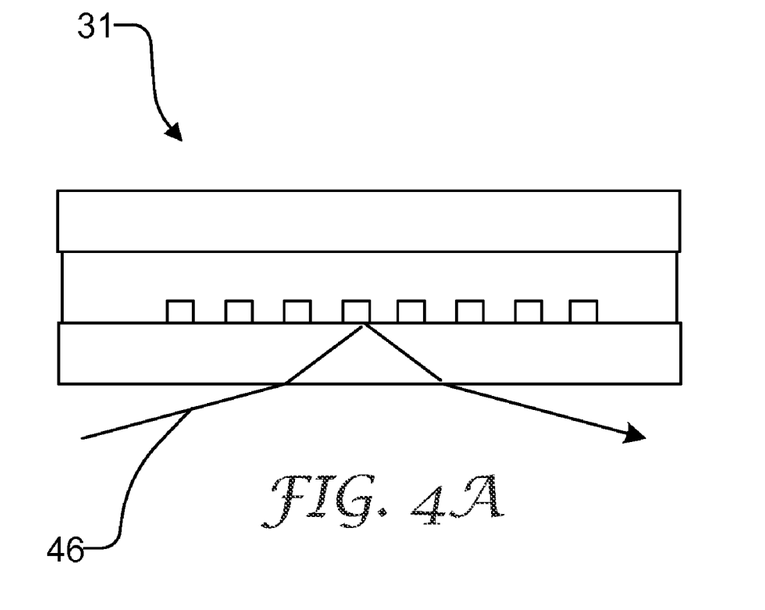
FIGS. 4A and 4B depict the reflection and transmission of incident light from the FIG. 3 diffraction grating.
Figure 4B:
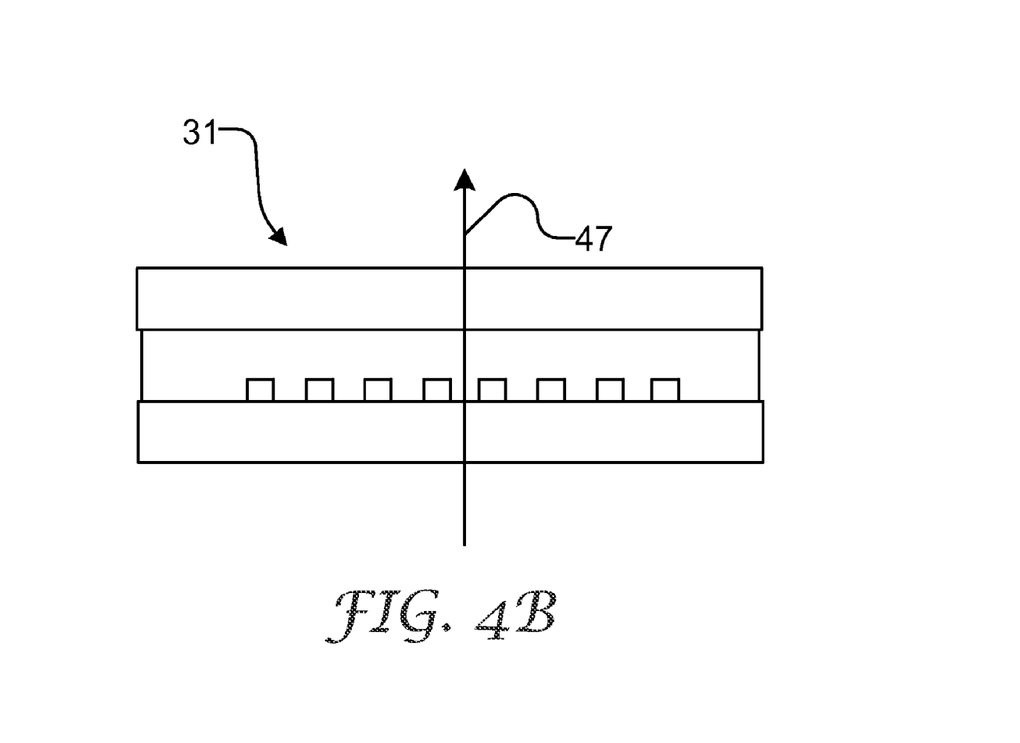

Device 31 can be used in either reflective mode, as schematically depicted by ray 46 in FIG. 4A, or transmissive mode, as schematically depicted by ray 47 in FIG. 4B. If index-modifying ions 32 are light-absorbing, the concentration of ions 32 in electrophoretic medium 33 is preferably sufficiently high to achieve good light absorption in the FIG. 3B state and sufficiently low that most ions 32 in medium 33 are concentrated toward region 44 near electrode 35 in the FIG. 3C state to reduce the amount of light absorbed by dye ions 32 which remain in medium 33 in the FIG. 3C state.

As light of initial intensity $I_o$ passes through an absorptive medium, the intensity I decreases exponentially, i.e. $I=I_o e^{-kx}$ where x is the path length through the absorptive medium and $k=nA_c$, where n is the number density of absorptive ions in the medium (in units of $m^{-3}$) and $A_c$ is the absorption cross section (in units of $m^2$). The degree of index-modification can be increased by using ions having a large absorption cross-section (e.g. greater than $10^{-22}$ $m^2$). For example, polymer dye ions having many monomer units and a single electron charge may be used as index-modifying ions 32. Each such ion may be up to 10 nm long, it being noted that 10 nm is substantially smaller than a wavelength of visible light. This is advantageous since particles of this size will not scatter light and will fit within the evanescent wave when the particles are moved into region 42. Furthermore, such ions are relatively small so they can be quickly and readily diffused into the optically active region of device 31.

It is advantageous to prevent (or minimize) electrolysis or other electrochemical reactions from occurring at the surface of the electrodes (i.e. grating 28 and electrode 35) since such reactions may change the electrostatic charge characteristics of ions 32 and may also cause irreversible chemical changes to the electrodes. This can be accomplished by coating the electrodes with a thin (e.g. less than 250 nm and, in some embodiments, less than 50 nm) layer of insulating material such as a vapor deposited oxide coating, or by adapting voltage source 26 to apply a sufficiently low voltage (e.g. less than 1V) such that an electrochemical reaction does not occur (or occurs at a negligible rate).

Index-modification can also be increased in the modified state by increasing the effective surface area of the electrodes, thereby increasing their capacitance and consequently increasing the amount of charge built up between the electrodes in response to an applied electric field. This can be achieved by coating the electrodes (and/or substrate 30 and/or superstrate 34) with thin (e.g. less than 500 nm) layers of transparent, electrically-conductive, nano-structured or nano-porous material such as a carbon nanotube film as described in "Transparent Conductive Carbon Nanotube Films," Z. Wu et al., Science Vol. 305, No. 5668, pp. 1273-1276, or a porous transparent conductive coating fabricated by the glancing angle deposition ("GLAD") technique described by Robbie et al in U.S. Pat. Nos. 5,866,204; 6,206,065; and 6,248,422, which are incorporated herein by reference.

Nano-structured or nano-porous layers can yield an effective surface area several hundred times larger than that of an equally-sized non-nano-structured or non-nano-porous layer. The surface features of nano-structured or nano-porous layers are characterized by dimensions on the order of about 1 to 100 nm, which is much smaller than the wavelength of light (~500 nm). Consequently, nano-structured or nano-porous layers do not interfere with TIR of light rays. Although nano-structured or nano-porous layers are typically transversely electrically conductive (i.e. in the direction normal to the flat outward diffraction surface) they need not have high lateral electrical conductivity (i.e. in directions generally parallel to the flat outward diffraction surface) since the electrodes themselves have high lateral electrical conductivity. However, if the nano-structured or nano-porous layers have sufficient lateral electrical conductivity, distinct electrodes may not be required and nano-structured or nano-porous layers may be used directly on substrate 30 and/or superstrate 34.

Figure 5A:
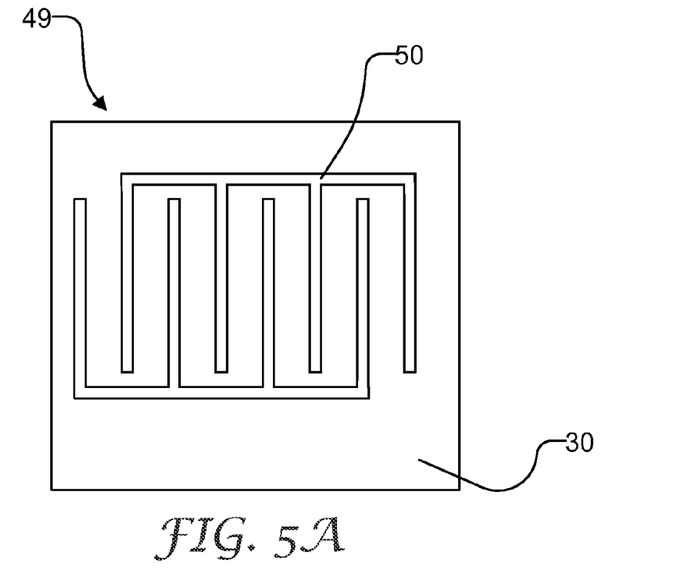
FIGS. 5A, 5B and 5C are greatly enlarged, not to scale, top view and cross-sectional side elevation views of a portion of an electrophoretically modulated interleaved diffraction grating according to another exemplary embodiment of the invention.
Figure 5B:
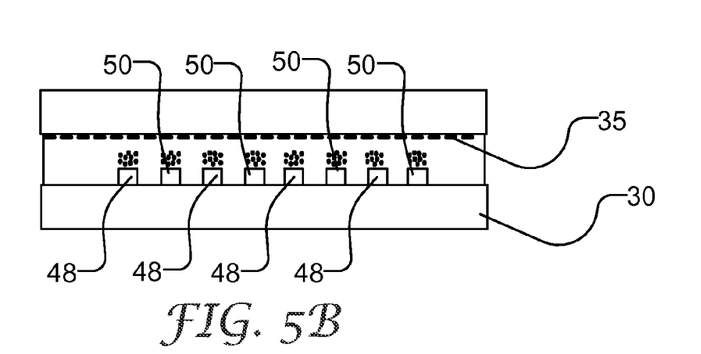
Figure 5C:
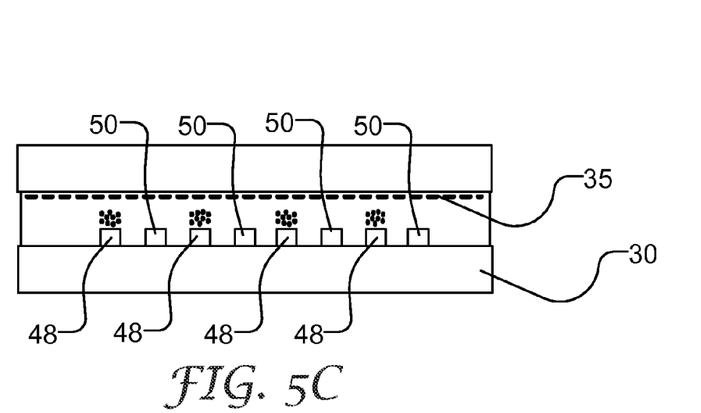

FIGS. 3A, 3B and 3C schematically depict an exemplary embodiment in order to describe a number of the principles. For a practical two-state deflection or focusing device based on these principles, it is desirable to select the dimension and shape of the diffraction grating so that the diffraction pattern is well-defined. For example, two or more independently controlled, interleaved electrodes could be used to create a device with more than two states. FIGS. 5A, 5B and 5C schematically depict a device 49 according to one such example. FIG. 5A depicts two interleaved diffraction gratings 48 and 50 on a substrate 30. Gratings 48 and 50 are electrically isolated so that they can be independently controlled. FIG. 5B depicts device 49 in a first state wherein a voltage is applied between both gratings 48 and 50 and electrode 35, such that the electrophoretic species 32 migrates to a region near gratings 48 and 50. FIG. 5C depicts a second state of device 49, wherein the applied voltage is applied only between grating 48 and electrode 35, such that electrophoretic species 32 migrates to the region near grating 48 but not grating 50. By alternating between the two states, the diffraction pattern and thus the deflection angle of the diffracted light can be changed.

The present invention may involve a variety of diffractive phenomena and may be described in a variety of manners. In one embodiment index modifying ions are contained in an electrophoretic medium. A controllable voltage source is able to apply first and second electrical field patterns in the electrophoretic medium. The index modifying ions assume first and second spatial distributions which in turn causes light passing therethrough to form first and second light distributions wherein the second light distribution differs from the first light distribution in that at least five percent of the light travels in a different direction due to diffraction. In another embodiment the second light distribution differs from the first light distribution in that at least ten percent of the light travels in a different direction due to diffraction.

In another embodiment the first and second spatial distributions result in first and second diffraction patterns that differ from one another by at least one of: an optical power distribution within their respective diffraction orders; and an angular orientation of their respective diffraction orders with respect to a common normal. For these purposes the angular orientation of a diffractive order is the angle between the direction of that order and the direction of the $0^{th}$ order.

The electric field may be applied by means of a first electrode that is contiguous with an interface of the electrophoretic medium and a second electrode spaced apart from the first electrode. One or both of the electrodes may be periodic. If they are periodic the period may be less than about 10 μm.

In another embodiment the difference between the optical power in a $1^{st}$ order of the first diffraction pattern and the optical power in a $1^{st}$ order of the second diffraction pattern is greater than 5% of the greater of: the optical power in the $1^{st}$ order of the first diffraction pattern and the optical power in the $1^{st}$ order of the second diffraction pattern. In another embodiment the difference between the optical power in a $1^{st}$ order of the first diffraction pattern and the optical power in a $1^{st}$ order of the second diffraction pattern is greater than 10% of the greater of: the optical power in the $1^{st}$ order of the first diffraction pattern and the optical power in the $1^{st}$ order of the second diffraction pattern.

In another embodiment the difference between the optical power in a $0^{th}$ order of the first diffraction pattern and the optical power in a $0^{th}$ order of the second diffraction pattern is greater than 5% of the greater of: the optical power in the $0^{th}$ order of the first diffraction pattern and the optical power in the $0^{th}$ order of the second diffraction pattern. In another embodiment the difference between the optical power in a $0^{th}$ order of the first diffraction pattern and the optical power in a $0^{th}$ order of the second diffraction pattern is greater than 10% of the greater of: the optical power in the $0^{th}$ order of the first diffraction pattern and the optical power in the $0^{th}$ order of the second diffraction pattern.

In another embodiment the difference between an angular orientation of a $1^{st}$ order of the first diffraction pattern and an angular orientation of a $1^{st}$ order of the second diffraction pattern is greater than 5% of the greater of: the angular orientation of the $1^{st}$ order of the first diffraction pattern and the angular orientation of the $1^{st}$ order of the second diffraction pattern. In another embodiment the difference between an angular orientation of a $1^{st}$ order of the first diffraction pattern and an angular orientation of a $1^{st}$ order of the second diffraction pattern is greater than 10% of the greater of: the angular orientation of the $1^{st}$ order of the first diffraction pattern and the angular orientation of the $1^{st}$ order of the second diffraction pattern.

In another embodiment in the absence of an electric field in the electrophoretic medium, light diffracted from the apparatus exhibits an ambient diffraction pattern wherein optical power in each non-zero order of the ambient diffraction pattern is less than about 1% of the optical power in the $0^{th}$ order and wherein, upon application of the first electric field in the electrophoretic medium, light diffracted from the apparatus exhibits a first diffraction pattern wherein optical power in at least one non-zero order of the first diffraction pattern is greater than about 5% of the optical power in the $0^{th}$ order.

Those skilled in the art will appreciate that the invention described herein may be provided in accordance with a wide variety of suitable embodiments. For example, one could design a diffraction grating which in the neutral state (e.g. a state without applied voltage) causes a significant percentage of the light to be contained in the zeroth order of the diffraction pattern. Upon applying a voltage to the electrophoretic medium, this diffraction grating would be changed by the presence of the particles in order to deflect a significant percentage of the light from the zeroth order into the first order. A more complicated electrode pattern, such as an arrangement of concentric circular ITO traces, could also be used. A device incorporating such an electrode pattern could enable a focusing effect, not just the deflection of the incident light.

While a number of exemplary aspects and embodiments have been discussed above, those of skill in the art will recognize certain modifications, permutations, additions and sub-combinations thereof. For example:

Persons skilled in the art will understand that the nano-structured or nano-porous layers can be applied to the embodiment of FIGS. 3A, 3B, 3C, 4A and 4B.

Persons skilled in the art will understand that a wide range of diffracting grating configurations can be applied to any of the embodiments of FIGS. 3A, 3B, 3C, 4A and 4B.

The use of electrophoresis to locally modify the refractive index near a diffraction grating can be applied to any diffracting grating for which an index modification will cause a change in the intensity or direction of the diffracted light.

Although the embodiments described herein are described in relation to light, it will be well understood by those skilled in the art that the invention could have application to electromagnetic radiation having wavelengths in the non-visible spectrum.

All such modifications, permutations, additions and sub-combinations are within the true spirit and scope of the invention.

What is claimed is:

1. An apparatus for controllably modulating light diffracted therefrom, the apparatus comprising:
   an electrophoretic medium comprising index-modifying ions, the index-modifying ions having characteristics whereby a presence of a sufficient concentration of index-modifying ions in a particular region modifies a local refractive index in the particular region;
   a controllable voltage source connected to create a first electric field pattern in the electrophoretic medium, the first electric field pattern causing electrophoretic movement of the index-modifying ions into a first spatial distribution resulting in a first diffraction pattern of light diffracted from the apparatus, and to create a second electric field pattern in the electrophoretic medium, the second electric field pattern causing electrophoretic movement of the index-modifying ions into a second spatial distribution resulting in a second diffraction pattern of light diffracted from the apparatus;
   wherein the first and second diffraction patterns differ from one another by at least one of: an optical power distribution within their respective diffraction orders; and an angular orientation of their respective diffraction orders with respect to a common normal;
wherein the voltage source is connected between at least one first electrode contiguous with an interface of the electrophoretic medium and at least one second electrode spaced apart from the at least one first electrode; and
wherein at least one of the at least one first electrode and the at least one second electrode is coated with a nano-structured layer or a nano-porous layer.

2. An apparatus according to claim 1 wherein the index-modifying ions have characteristics whereby the presence of the sufficient concentration of index-modifying ions in the particular region modifies a real component of the local refractive index.

3. An apparatus according to claim 1 wherein the index-modifying ions have characteristics whereby the presence of the sufficient concentration of index-modifying ions in the particular region modifies an imaginary component of the local refractive index.

4. An apparatus according to claim 1 wherein the first diffraction pattern of light diffracted from the apparatus and the second diffraction pattern of light diffracted from the apparatus both result from light that is incident on the electrophoretic medium and is transmitted therethrough.

5. An apparatus according to claim 1 wherein the first diffraction pattern of light diffracted from the apparatus and the second diffraction pattern of light diffracted from the apparatus both result from light that is incident on the electrophoretic medium and is reflected therefrom.

6. An apparatus according to claim 1 wherein the at least one first electrode is spatially periodic on at least one dimension over a substantial portion thereof.

7. An apparatus according to claim 6 wherein the spatial period of the at least one first electrode on the at least one dimension is less than about 10 μm.

8. An apparatus according to claim 1 wherein the at least one first electrode is transparent.

9. An apparatus according to claim 1 wherein the ions have an absorption cross-section greater than $10^{-22}$ m$^2$.

10. An apparatus for controllably modulating light diffracted therefrom, the apparatus comprising:
- an electrophoretic medium comprising index-modifying ions, the index-modifying ions having characteristics whereby a presence of a sufficient concentration of index-modifying ions in a particular region modifies a local refractive index in the particular region;
- a controllable voltage source connected to create a first electric field pattern in the electrophoretic medium, the first electric field pattern causing electrophoretic movement of the index-modifying ions into a first spatial distribution resulting in a first diffraction pattern of light diffracted from the apparatus, and to create a second electric field pattern in the electrophoretic medium, the second electric field pattern causing electrophoretic movement of the index-modifying ions into a second spatial distribution resulting in a second diffraction pattern of light diffracted from the apparatus;
- wherein the first and second diffraction patterns differ from one another by at least one of: an optical power distribution within their respective diffraction orders; and an angular orientation of their respective diffraction orders with respect to a common normal;

wherein a difference between the optical power in a $1^{st}$ order of the first diffraction pattern and the optical power in a $1^{st}$ order of the second diffraction pattern is greater than 5% of the greater of: the optical power in the $1^{st}$ order of the first diffraction pattern and the optical power in the $1^{st}$ order of the second diffraction pattern.

11. An apparatus for controllably modulating light diffracted therefrom, the apparatus comprising:
- an electrophoretic medium comprising index-modifying ions, the index-modifying ions having characteristics whereby a presence of a sufficient concentration of index-modifying ions in a particular region modifies a local refractive index in the particular region;
- a controllable voltage source connected to create a first electric field pattern in the electrophoretic medium, the first electric field pattern causing electrophoretic movement of the index-modifying ions into a first spatial distribution resulting in a first diffraction pattern of light diffracted from the apparatus, and to create a second electric field pattern in the electrophoretic medium, the second electric field pattern causing electrophoretic movement of the index-modifying ions into a second spatial distribution resulting in a second diffraction pattern of light diffracted from the apparatus;
- wherein the first and second diffraction patterns differ from one another by at least one of: an optical power distribution within their respective diffraction orders; and an angular orientation of their respective diffraction orders with respect to a common normal;

wherein a difference between the optical power in a $0^{th}$ order of the first diffraction pattern and the optical power in a $0^{th}$ order of the second diffraction pattern is greater than 5% of the greater of: the optical power in the $0^{th}$ order of the first diffraction pattern and the optical power in the $0^{th}$ order of the second diffraction pattern.

12. An apparatus for controllably modulating light diffracted therefrom, the apparatus comprising:
- an electrophoretic medium comprising index-modifying ions, the index-modifying ions having characteristics whereby a presence of a sufficient concentration of index-modifying ions in a particular region modifies a local refractive index in the particular region;
- a controllable voltage source connected to create a first electric field pattern in the electrophoretic medium, the first electric field pattern causing electrophoretic movement of the index-modifying ions into a first spatial distribution resulting in a first diffraction pattern of light diffracted from the apparatus, and to create a second electric field pattern in the electrophoretic medium, the second electric field pattern causing electrophoretic movement of the index-modifying ions into a second spatial distribution resulting in a second diffraction pattern of light diffracted from the apparatus;
- wherein the first and second diffraction patterns differ from one another by at least one of: an optical power distribution within their respective diffraction orders; and an angular orientation of their respective diffraction orders with respect to a common normal;

wherein a difference between an angular orientation of a $1^{st}$ order of the first diffraction pattern and an angular orientation of a $1^{st}$ order of the second diffraction pattern is greater than 5% of the greater of: the angular orientation of the $1^{st}$ order of the first diffraction pattern and the angular orientation of the $1^{st}$ order of the second diffraction pattern.

13. An apparatus for controllably modulating light diffracted therefrom, the apparatus comprising:
- an electrophoretic medium comprising index-modifying ions, the index-modifying ions having characteristics whereby a presence of a sufficient concentration of index-modifying ions in a particular region modifies a local refractive index in the particular region;
- a controllable voltage source connected to create a first electric field pattern in the electrophoretic medium, the first electric field pattern causing electrophoretic movement of the index-modifying ions into a first spatial distribution resulting in a first diffraction pattern of light diffracted from the apparatus, and to create a second electric field pattern in the electrophoretic medium, the second electric field pattern causing electrophoretic movement of the index-modifying ions into a second spatial distribution resulting in a second diffraction pattern of light diffracted from the apparatus;
- wherein the first and second diffraction patterns differ from one another by at least one of: an optical power distribution within their respective diffraction orders; and an angular orientation of their respective diffraction orders with respect to a common normal;

wherein a difference between an angular orientation of a $2^{nd}$ order of the first diffraction pattern and an angular orientation of a $2^{nd}$ order of the second diffraction pattern is greater than 5% of the greater of: the angular orientation of the $2^{nd}$ order of the first diffraction pattern and the angular orientation of the $2^{nd}$ order of the second diffraction pattern.

14. An apparatus for controllably modulating one or more characteristics of light diffracted therefrom, the apparatus comprising:
- an electrophoretic medium comprising one or more index-modifying ions dissolved therein, the index-modifying ions having light-interaction characteristics such that, when the ions are present in a sufficient concentration in a particular region of the medium, the light-interaction characteristics of the ions modify a local refractive index in the particular region;

a controllable voltage source connected to apply a first electric field within the medium and to thereby cause electrophoretic movement of the ions within the medium to a first spatial distribution;

wherein, in the absence of an electric field in the electrophoretic medium, light diffracted from the apparatus exhibits an ambient diffraction pattern wherein optical power in each non-zero order of the ambient diffraction pattern is less than about 1% of the optical power in the $0^{th}$ order and wherein, upon application of the first electric field in the electrophoretic medium, light diffracted from the apparatus exhibits a first diffraction pattern wherein optical power in at least one non-zero order of the first diffraction pattern is greater than about 5% of the optical power in the $0^{th}$ order.

15. An apparatus according to claim 14 wherein the ambient diffraction pattern of light diffracted from the apparatus and the first diffraction pattern of light diffracted from the apparatus both result from light that is incident on the electrophoretic medium and is transmitted therethrough.

16. An apparatus according to claim 14 wherein the ambient diffraction pattern of light diffracted from the apparatus and the first diffraction pattern of light diffracted from the apparatus both result from light that is incident on the electrophoretic medium and is reflected therefrom.

17. An apparatus according to claim 14 wherein the voltage source is connected between at least one first electrode contiguous with an interface of the electrophoretic medium and at least one second electrode spaced apart from the at least one first electrode.

18. An apparatus according to claim 17 wherein the at least one first electrode is spatially periodic on at least one dimension over a substantial portion thereof.

19. An apparatus according to claim 18 wherein the spatial period of the at least one first electrode on the at least one dimension is less than about 10 μm.

20. An apparatus according to claim 17 wherein the at least one first electrode is transparent.

21. An apparatus according to claim 17 wherein at least one of the at least one first electrode and the at least one second electrode is coated with a nano-structured layer or a nano-porous layer.

22. An apparatus according to claim 14 wherein the ions have an absorption cross-section greater than $10^{-22}$ m$^2$.

23. An apparatus according to claim 14 wherein the voltage source is connected to create a second electric field within the medium and to thereby cause electrophoretic movement of the ions within the medium to a second spatial distribution resulting in a second diffraction pattern of light diffracted from the apparatus and wherein the first and second diffraction patterns differ from one another by at least one of: an optical power distribution within their respective diffraction orders; an angular orientation of their respective diffraction orders with respect to a common normal.

24. An apparatus according to claim 23 wherein a difference between the optical power in a $1^{st}$ order of the first diffraction pattern and the optical power in a $1^{st}$ order of the second diffraction pattern is greater than 5% of the greater of: the optical power in the $1^{st}$ order of the first diffraction pattern and the optical power in the $1^{st}$ order of the second diffraction pattern.

25. An apparatus according to claim 23 wherein a difference between an angular orientation of a $1^{st}$ order of the first diffraction pattern and an angular orientation of a $1^{st}$ order of the second diffraction pattern is greater than 5% of the greater of: the angular orientation of the $1^{st}$ order of the first diffraction pattern and the angular orientation of the $1^{st}$ order of the second diffraction pattern.

26. An apparatus for controllably modulating one or more characteristics of light diffracted therefrom, the apparatus comprising:

an electrophoretic medium comprising index-modifying ions dissolved therein, the index-modifying ions having characteristics whereby a presence of a sufficient concentration of index-modifying ions in a particular region modifies a local refractive index in the particular region;

a controllable voltage source connected to create a first electric field pattern in the electrophoretic medium, the first electric field pattern causing electrophoretic movement of the index-modifying ions into a first spatial distribution resulting in a first diffraction pattern of light diffracted from the apparatus, and to create a second electric field pattern in the electrophoretic medium, the second electric field pattern causing electrophoretic movement of the index-modifying ions into a second spatial distribution resulting in a second diffraction pattern of light diffracted from the apparatus;

wherein the first and second diffraction patterns differ from one another by at least one of:

an optical power distribution within their respective diffraction orders wherein a difference between the optical power in a $1^{st}$ order of the first diffraction pattern and the optical power in a $1^{st}$ order of the second diffraction pattern is greater than 5% of the greater of: the optical power in the $1^{st}$ order of the first diffraction pattern and the optical power in the $1^{st}$ order of the second diffraction pattern; and an angular orientation of their respective diffraction orders with respect to a common normal, wherein a difference between an angular orientation of a $1^{st}$ order of the first diffraction pattern and an angular orientation of a $1^{st}$ order of the second diffraction pattern is greater than 5% of the greater of: the angular orientation of the $1^{st}$ order of the first diffraction pattern and the angular orientation of the $1^{st}$ order of the second diffraction pattern.

27. A method for controllably modulating diffracted light, the method comprising:

providing an electrophoretic medium comprising index-modifying ions dissolved therein, the index-modifying ions having characteristics whereby a presence of a sufficient concentration of index-modifying ions in a particular region modifies a local refractive index in the particular region;

establishing a first electric field pattern in the electrophoretic medium, the first electric field pattern causing electrophoretic movement of the index-modifying ions into a first spatial distribution resulting in a first diffraction pattern of diffracted light; and establishing a second electric field pattern in the electrophoretic medium, the second electric field pattern causing electrophoretic movement of the index-modifying ions into a second spatial distribution of diffracted light;

wherein the first and second diffraction patterns differ from one another by at least one of: an optical power distribution within their respective diffraction orders; and an angular orientation of their respective diffraction orders with respect to a common normal;

wherein a difference between the optical power in a $1^{st}$ order of the first diffraction pattern and the optical power in a $1^{st}$ order of the second diffraction pattern is greater than 5% of the greater of: the optical power in the $1^{st}$ order of the first diffraction pattern and the optical power in the $1^{st}$ order of the second diffraction pattern.

28. A method according to claim 27 wherein the first diffraction pattern and the second diffraction pattern both result from light that is incident on the electrophoretic medium and is transmitted therethrough.

29. A method according to claim 27 wherein the first diffraction pattern and the second diffraction pattern both result from light that is incident on the electrophoretic medium and is reflected therefrom.

30. A method for controllably modulating diffracted light, the method comprising:

providing an electrophoretic medium comprising index-modifying ions dissolved therein, the index-modifying ions having characteristics whereby a presence of a sufficient concentration of index-modifying ions in a particular region modifies a local refractive index in the particular region;

establishing a first electric field pattern in the electrophoretic medium, the first electric field pattern causing electrophoretic movement of the index-modifying ions into a first spatial distribution resulting in a first diffraction pattern of diffracted light; and establishing a second electric field pattern in the electrophoretic medium, the second electric field pattern causing electrophoretic movement of the index-modifying ions into a second spatial distribution of diffracted light;

wherein the first and second diffraction patterns differ from one another by at least one of: an optical power distribution within their respective diffraction orders; and an angular orientation of their respective diffraction orders with respect to a common normal;

wherein a difference between the optical power in a $0^{th}$ order of the first diffraction pattern and the optical power in a $0^{th}$ order of the second diffraction pattern is greater than 5% of the greater of: the optical power in the $0^{th}$ order of the first diffraction pattern and the optical power in the $0^{th}$ order of the second diffraction pattern.

31. A method for controllably modulating diffracted light, the method comprising:

providing an electrophoretic medium comprising index-modifying ions dissolved therein, the index-modifying ions having characteristics whereby a presence of a sufficient concentration of index-modifying ions in a particular region modifies a local refractive index in the particular region;

establishing a first electric field pattern in the electrophoretic medium, the first electric field pattern causing electrophoretic movement of the index-modifying ions into a first spatial distribution resulting in a first diffraction pattern of diffracted light; and establishing a second electric field pattern in the electrophoretic medium, the second electric field pattern causing electrophoretic movement of the index-modifying ions into a second spatial distribution of diffracted light;

wherein the first and second diffraction patterns differ from one another by at least one of: an optical power distribution within their respective diffraction orders; and an angular orientation of their respective diffraction orders with respect to a common normal;

wherein a difference between an angular orientation of a $1^{st}$ order of the first diffraction pattern and an angular orientation of a $1^{st}$ order of the second diffraction pattern is greater than 5% of the greater of: the angular orientation of the $1^{st}$ order of the first diffraction pattern and the angular orientation of the $1^{st}$ order of the second diffraction pattern.

32. A method for controllably modulating diffracted light, the method comprising:

providing an electrophoretic medium comprising index-modifying ions dissolved therein, the index-modifying ions having characteristics whereby a presence of a sufficient concentration of index-modifying ions in a particular region modifies a local refractive index in the particular region;

establishing a first electric field pattern in the electrophoretic medium, the first electric field pattern causing electrophoretic movement of the index-modifying ions into a first spatial distribution resulting in a first diffraction pattern of diffracted light; and establishing a second electric field pattern in the electrophoretic medium, the second electric field pattern causing electrophoretic movement of the index-modifying ions into a second spatial distribution of diffracted light;

wherein the first and second diffraction patterns differ from one another by at least one of: an optical power distribution within their respective diffraction orders; and an angular orientation of their respective diffraction orders with respect to a common normal;

wherein a difference between an angular orientation of a $2^{nd}$ order of the first diffraction pattern and an angular orientation of a $2^{nd}$ order of the second diffraction pattern is greater than 5% of the greater of: the angular orientation of the $2^{nd}$ order of the first diffraction pattern and the angular orientation of the $2^{nd}$ order of the second diffraction pattern.

* * * * *